United States Patent [19]

Gerry

[11] 4,038,691

[45] July 26, 1977

[54] STILL IMAGE SLIDE COMBINATION WITH SEQUENTIALLY ACTIVATED AUDIO CHANNELS PER SLIDE

[76] Inventor: Martin E. Gerry, 13452 Winthrope St., Santa Ana, Calif. 92705

[21] Appl. No.: 671,013

[22] Filed: Mar. 26, 1976

[51] Int. Cl.² .................. G11B 5/008; G11B 23/44
[52] U.S. Cl. .................................... 360/2; 352/26; 360/63; 360/82
[58] Field of Search ............... 353/19; 352/1, 5, 26, 352/37; 360/1, 2, 82, 85, 86, 63

[56] References Cited

U.S. PATENT DOCUMENTS

| | | | |
|---|---|---|---|
| 2,924,668 | 2/1960 | Hoshino | 360/2 |
| 3,248,717 | 4/1966 | Mayhew | 360/63 |
| 3,271,777 | 9/1966 | Davis | 360/63 |
| 3,315,041 | 4/1967 | Sampson | 360/63 |
| 3,332,319 | 7/1967 | Gerry | 353/19 |
| 3,751,151 | 8/1973 | Petterson | 353/19 |
| 3,790,265 | 2/1974 | Ogiso | 353/19 |
| 3,891,830 | 6/1975 | Goldman | 360/2 |

Primary Examiner—Jay P. Lucas

[57] ABSTRACT

Means providing stationary images have associated therewith sound related to each of the images. A plural number of non-translatable magnetic heads are used in conjunction with a control circuit so as to extend the recording time by enabling the recording or reproducing of independent sound tracks, one sound track per head, and switching such heads in sequence at end of each record or reproduce period. The control circuit may be electronic or electromechanical.

16 Claims, 9 Drawing Figures

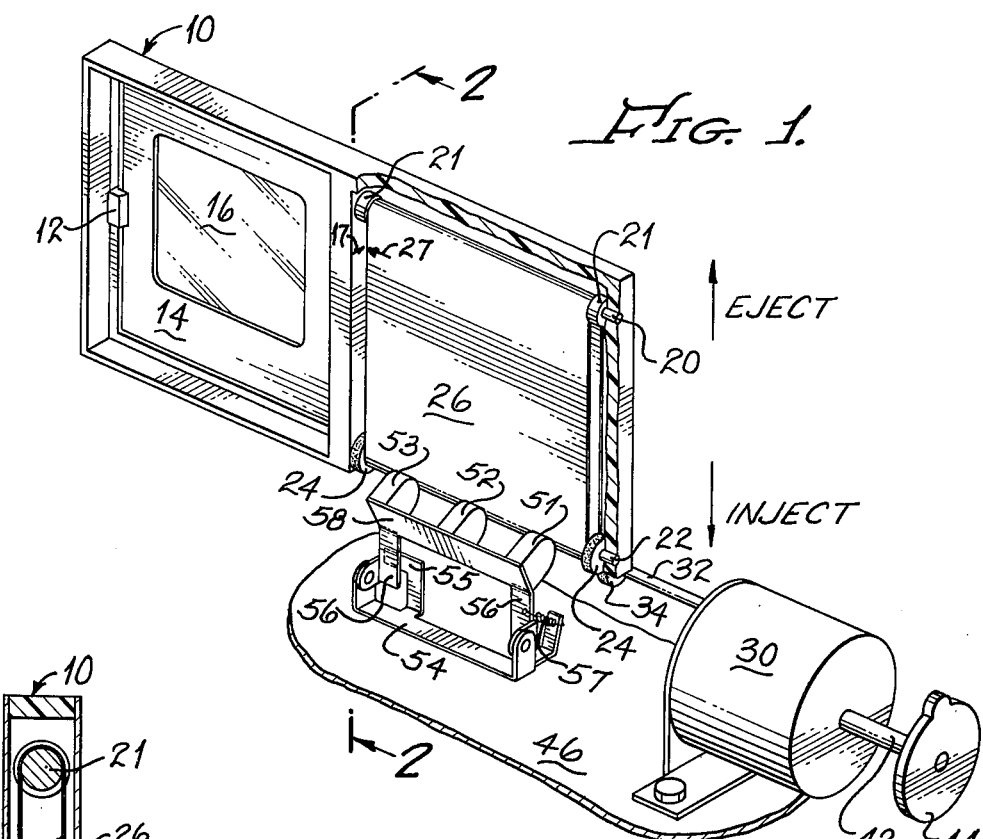
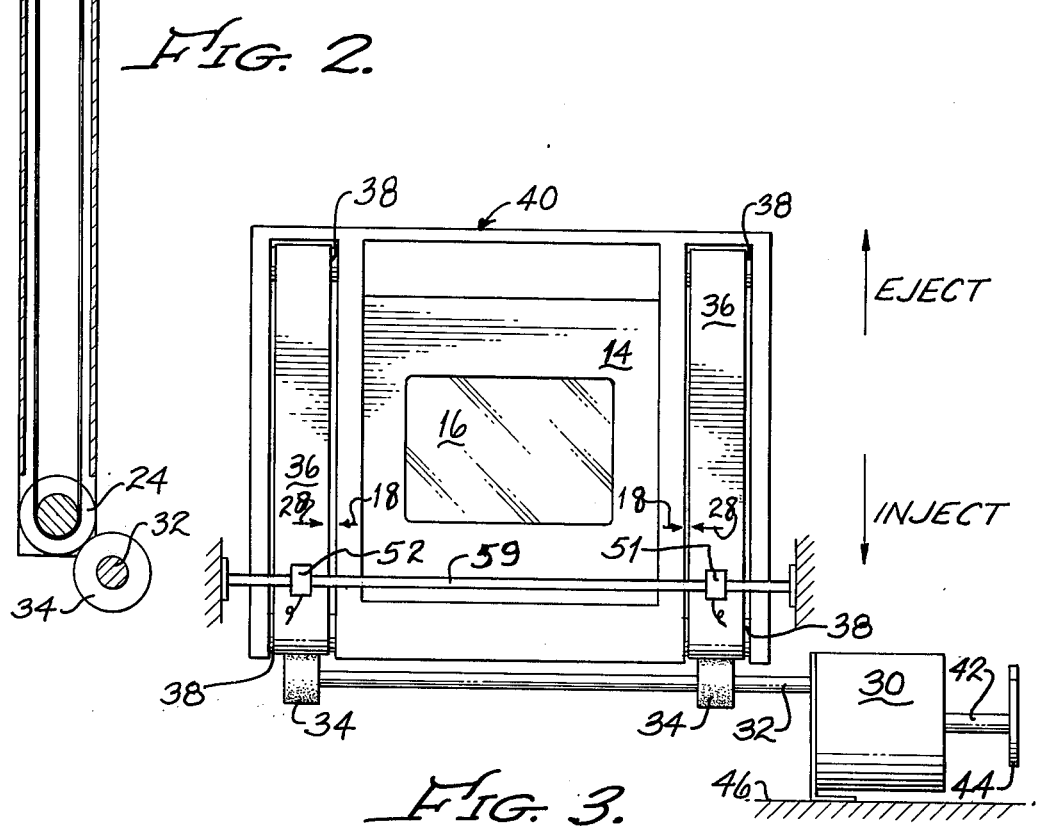

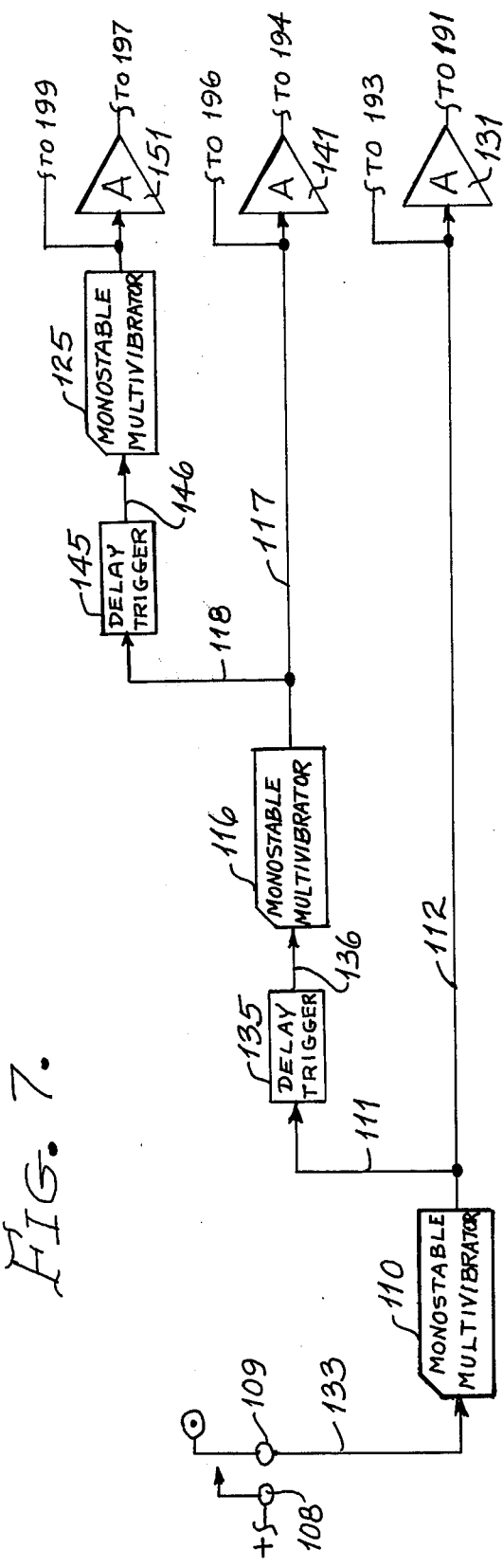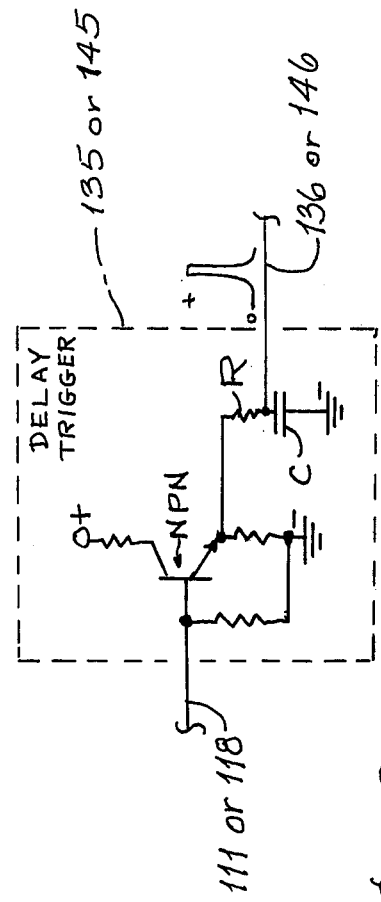
Fig. 7.
Fig. 8.

STILL IMAGE SLIDE COMBINATION WITH SEQUENTIALLY ACTIVATED AUDIO CHANNELS PER SLIDE

BACKGROUND OF THE INVENTION

This invention relates to the audio-visual field wherein sound is integrated with each still image to explain the contents of the image photographed or projected.

An objective of the invention is to provide transducer heads that need not be translated in order to record or reproduce sound.

Another objective is to provide more than one record or reproduce head associated with a driven record medium so that each head makes its own sound track independent of the tracks of other heads, but that the heads are sequentially switched after a predetermined period of operation of each head so that in effect the sound tracks made thereby are used in succession, consequently extending record or reproduce periods for each image photographed or displayed.

The prior art had the disadvantage of either having to transport or translate the head with respect to the record medium, or where the head is stationary, the amount of recording time practically possible without undue complexity of structure, is very limited.

SUMMARY OF THE INVENTION

In a means providing stationary images and sound related to the images, a combination of a plural number of non-translatable magnetic transducer heads and control means connected to the heads for providing a plural number of independent sound tracks for each of the stationary images, one sound track per head.

The control means provides the sound tracks in predetermined sequence. Such control means may be of the digital electronic or of the electromechanical type.

The means having the stationary images comprises a slide frame and a translatable record portion as an integral part of the slide frame.

The translatable record medium may consist of one or more magnetic recording belts or a disk having a central opening which is circumjacent the slide frame.

The record medium may have rollers upon which to readily transport or translate the belt or belts.

An impeller wheel in cooperation with the rollers is provided, such impeller wheel being coupled to and driven by a motor during operative mode of the means.

The plurality of heads may be mounted so that their active recording or sensing portions are in cooperation with the record medium, and hence may require the heads to be pivotably arranged so that uniform pressure is actuated by the heads upon the surface of the record medium.

The motor is equipped with a timing cam which may have one or more switches in periodic cooperation therewith.

The digital circuitry comprises a plurality of monostable multivibrators connected to the switches, or optionally to each other through delay trigger circuits, for enabling their sequential operation for predetermined periods and hence operation for such predetermined periods to activate the heads.

BRIEF DESCRIPTION OF THE DRAWINGS

FIG. 1 is a perspective view, partially in cross-section, of a slide retainer frame having a translatable and driven recording belt integral therewith for cooperation with a plurality of substantially stationary magnetic heads.

FIG. 2 is a cross-section view taken at plane 2—2 of FIG. 1.

FIG. 3 is an elevation view of the slide retainer frame wherein two record belts are mounted integral with the frame at either side of a slide.

FIG. 7 is a schematic view of an electronic control system similar to that of FIG. 6, but simplified.

FIG. 8 is a schematic view of the time delay trigger circuit as used in FIG. 7 control system.

FIG. 9 is a schematic view of an electromechanical control system for performing the same functions as performed by the control systems of FIGS. 6 and 7.

DETAILED DESCRIPTION

Figure 4:
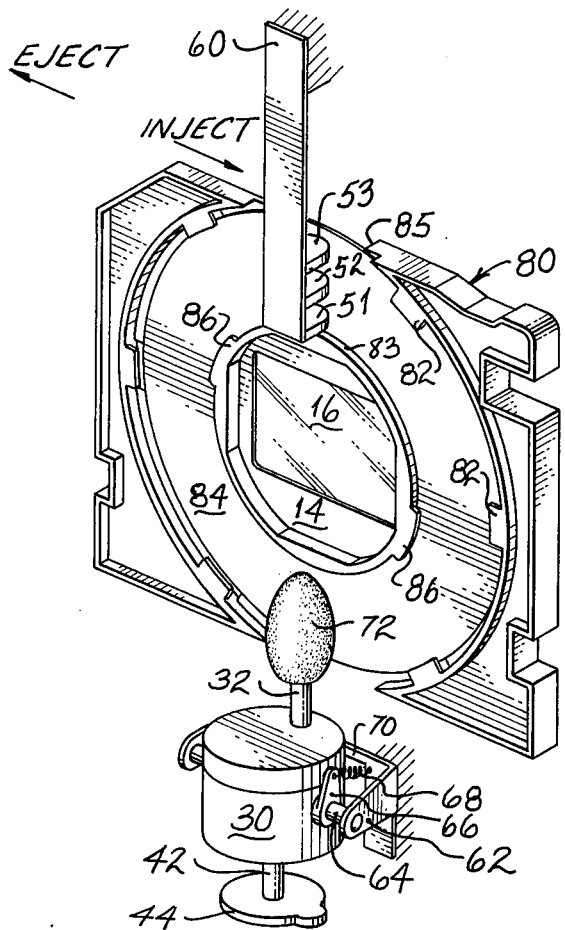
FIG. 4 is a perspective view of a slide retainer frame having a record medium with a central opening circumjacent a mounted slide within the frame, showing a plurality of mounted stationary record-reproduce heads.

Referring to FIGS. 1 and 2, a slide and magnetic belt retainer is shown at 10, the retainer being usually made of plastic material. This retainer is one that could be used in a still slide projector of the Kodak Carousel type or of the Sawyer projector type, but with sound added, or may be used as the sound recording or reproducing means shown in U.S. Pat. No. 3,526,454, or used in U.S. Pat. No. 3,592,535 in order to obtain multiple sound tracks without having to reposition such heads.

A conventional mounted slide is held by tabs 12 in retainer 10. Paper, plastic or metallic slide mount 14 retains slide or transparancy 16.

For retaining the magnetic recording-reproducing belt 26, a roller pin assembly is provided at 20 having guide rollers 21 for keeping belt 26 in taught and smooth drive position.

Drive wheels 24 having roughened peripheries are mounted on roller pin 22. Rollwer pin 22 maintains belt 26 in taught and straight running condition in conjunction with roller pin 20.

A motor as at 30 having a built-in reduction gear assembly has an output shaft 32 upon which roller wheels 34 with roughened peripheries are mounted for cooperation with roughened peripheries of drive wheels 24 so as to drive pins 22 and belt 26, pin 20 being driven by virtue of taught belt 26, when motor 30 is electrically energized.

Motor 30 also has another output shaft 42 at opposite end to shaft 32, upon which cam 44 is mechanically attached.

The internal gearing of motor 30 is such so that when belt 26 makes three complete revolutions, cam 44 will make one complete revolution. Consequently, it can be seen that shaft 32 and wheels 34 and 24 will make a larger number of revolutions than made by belt 26 by the time cam 44 will have made one revolution. Due to the use, in this example, of three magnetic transducer heads 51, 52 and 53, such belt 26 needs to make three revolutions for one revolution of cam 44. If more than three heads were used there would be a corresponding number of more such belt revolutions. Further, since 30 seconds of record or reproduce time is desired, each revolution or complete excursion of belt 26 will take 10 seconds, so that during each of the three ten-seond periods recording or reproducing of sound will take place in sequence of the three sound tracks on belt 26 by virture of each of heads 51, 52 or 53 being only operative for a ten second period.

Motor 30 and its shafts, wheels and cam is mounted on rigid base 46. Also mounted on rigid base 46 is a bracket at 54 to which is pivotably coupled a pair of tabs 56. One of tabs 56 has a tension spring 57 connected between a portion of bracket 54 and tab 56. Bracket 54 has an extension 55 which is so positioned to cooperate with one of tabs 56 and thereby prevent overtravel of member 58 that is an integral part of tabs 56 and upon which heads 51, 52 and 53 are mounted. The inhibition to overtravel prevents interference of head mounting assembly with slide and belt and retainer 10 when it is inserted in a projector. On the other hand, spring 57 urges heads 51, 52 and 53 against the recording surface of belt 26 once retainer 10 is inserted in the projector.

The use of the three heads programmed to sequentially record or reproduce sound tracks and maintaining the heads in non-translation or substantially stationary mode will be explained in conjunction with electronic control apparatus below.

Referring to FIG. 3, a mounting structure at 40 for a conventional slide 16 mounted in its frame 14, has a pair of parallel running belts 36 at either side of structure 40, which belts are freely translatable guided on rollers at 38. As in case of FIGS. 1 and 2, the motor assembly is the same and consequently the peripherally roughened wheels 34 are in cooperation with the recording surfaces of belts 36 when structure 40 is injected in the projector for enabling belts 38 to be driven for two 10-second time periods, during which time cam 44 makes one revolution.

In this instance, only two heads 51 and 52 are used, which heads are mounted on a structural bar 59, which bar is part of the projector. The sensing surfaces of heads 51 and 52, are as in the case of FIGS. 1 and 2, in cooperation with surfaces of recording belts 36.

The circuit used to switch the heads, whether such circuit is electronic or electromechanical, will in this instance have two switching stages instead of the three stages used in the case of FIGS. 1 and 2.

Figure 5:
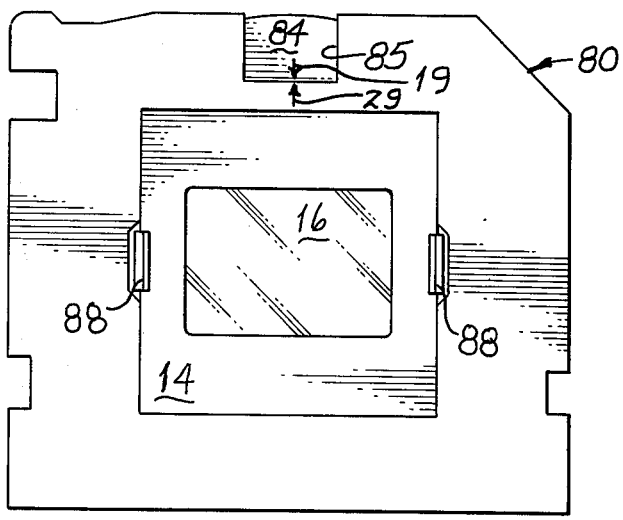
FIG. 5 is an elevation view of the other side of such view as seen in FIG. 4.

Referring to FIGS. 4 and 5, a slide retainer with a movable magnetic disk is provided at 80. Retainer 80 is more adaptable to projectors that have their slides injected sideways rather than being dropped into the projector from a tray on top of the projector, by gravitational action.

Retainer 80, of plastic material, retains the conventionally mounted slide 16 in its frame 14, frame 14 being held in the retainer by tabs 88.

Retainer 80 is recessed so that disk 84 may be held within the recess to the surface of the recess, opposite the surface at which the slide is held, by means of tabs 82, at the outer periphery of disk 84, and by means of tabs 86 at the inner periphery of the disk. Such disk 84 has a central opening 83 and tabs 86 will extend from opening 83 slightly over the inner periphery of disk 84, so that tabs 82 and 86 can guide disk 84 as the disk is driven by means of rubber drive element 72, mounted on motor shaft 32, circumjacent slide 16 without interfering with projection of image from the slide.

Retainer 80 has a cut out portion at 85 so that when heads 51, 52 and 53, mounted on flexible member 60, presses upon magnetic surface of disk 84, cut out portion 85 will permit the disk thereat to give slightly and thereby act as a light resilient member urging the sensing portions of the heads against the recording surface of the disk.

As in the case of FIGS. 1 and 2, three independent tracks will be made during recording mode and subsequently reproducing the recorded information, but since the speed of motor 30 is assumed constant, the inner track will provide the least recording surface per unit recording or reproducing time and hence will be of somewhat lower sound quality.

The motor, its shafts and reduction gears will be the same as in FIGS. 1 and 2, but the motor herein is mounted substantially parallel to the retainer surface so as to enable the disk to be moved easily by rotation of drive element 72. This motor is mounted on bracket 62 by means of pivot members 64 so that the motor may be tilted during injection or ejection of the retainer. One of pivot members 64 has an extension 66 mounted thereon to which is attached spring 68, the other end of spring 68 being attached to bracket 62 for enabling the motor to be tilted so that drive element 72 will be in cooperation with disk 84 when retainer 80 is inserted in its projector. To avoid overtravel of motor tilt and interference with retainer 80 during injection into the projector, extension bar 70 which is an integral portion of bracket 62, limits the motor tilt angle.

For the use with any of the FIGS., the electronic electromechanical control circuit will describe the method of using stationary heads to provide a record or reproduce sequence of three tracks, or impliedly more tracks, of sound.

With reference to FIG. 1, for presetting belt 26 prior to recording or reproducing sound, driven wheel 24 is rotated manually until a marking such as line 27 on belt 26 is in line with a marking or engraving 17 on surface of retainer 10.

With reference to FIG. 3, for presetting belts or tapes 36 prior to recording or reproducing sound, these belts are movved manually so that markings such as 28 thereon are opposite markings 18 or retainer member 40.

With reference to FIG. 5, for presetting disk 84 prior to recording or reproducing sound, the disk is manually rotated until marking 19 thereon is opposite marking 29 on retainer 80.

Once positioned opposite their respective aligned markings, the belts, tapes or disk should remain in place unless accidentally or purposely moved, in which case they can be easily repositioned.

Figure 6:
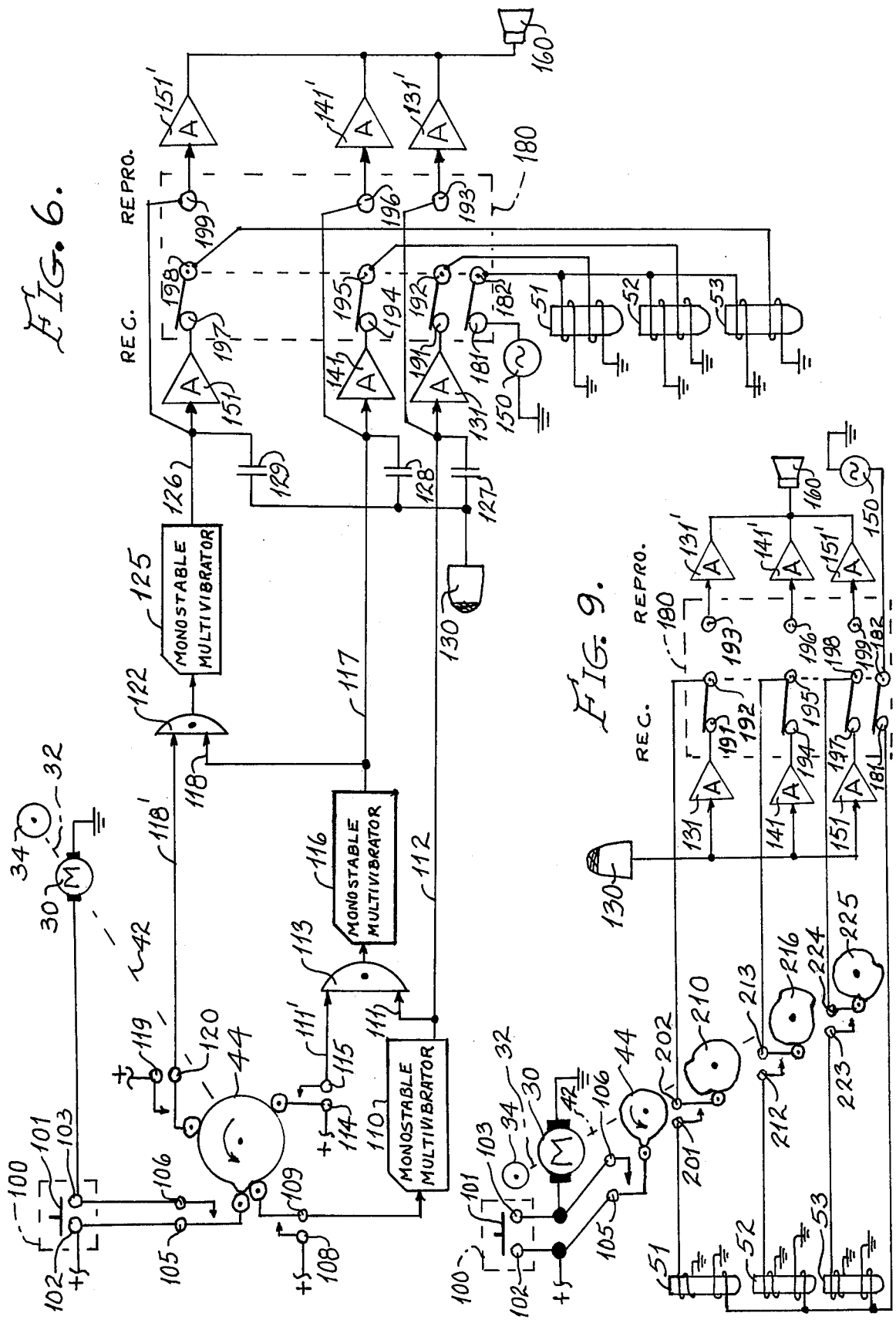
FIG. 6 is a schematic of an electronic control system for sequentially switching each of the heads after a predetermined time period of recording or reproducing sound from one head has elapsed.

Referring to FIG. 6, head switching control system and the structural figures hereinabove described, are utilized in conjunction with a plurality of stationary magnetic transducer heads wherein each head produces an independent sound track is sequential order and the several sound tracks are reproduced in the same sequential order. Such method utilizes digital control electronics.

Push button 100 is provided with a movable contactor 101 for momentary cooperation with a pair of stationary contactors 102 and 103. Contactor 102 is at positive DC potential. Contactor 103 is electrically connected to DC motor 30 and the return side of motor 30 is connected to negative DC potential illustrated by the conventional ground symbol. Such ground symbol as used herein is also applicable to the AC signal return path.

Motor 30 has a shaft on one side thereof that drives an impelling wheel 34 which translates the tape or other recording medium as above described, and another shaft at other end of the motor, that has cam 44 mounted thereon and which cam 44 rotates one revolution for many revolutions of wheel 34. The shaft driving cam 44 drives it in direction indicated thereon.

A microswitch consisting of contactors 105 and 106 is provided for action in conjunction with cam 44. Contactor 105 has a roller attached at its end which cooperates with the high portion of cam 44 during the non-operative mode of the system. Contactor 105 is also connected to contact 102 and is at positive DC potential. Contactor 106 is normally open with respect to contactor 105, is the non-operative mode, and is connected to contactor 103.

Upon momentarily depressing contactor 101 so it cooperates with contactors 102 and 103, power is applied to motor 30, starting shaft rotation of the motor and rotation of wheels 34 and cam 44. Contactors 105 and 106 will close, in view of the fact that the roller at end of contactor 105 is now positioned at the low portion of cam 44, and remain closed until a complete revolution of cam 44 occurs, at which time the high portion of cam 44 will again be in cooperation with the roller of contactor 105 to open contactors 105-106 and remove power from motor 30.

Contactor pair 108 and 109 comprises a microswitch positioned near the high portion of cam 44 where the roller at end of contactor 109 cooperates with the low portion of the cam. Upon start of rotation of cam 44, the high portion of cam 44 will cooperate with that roller and move contactor 109 so it cooperates with contactor 108 having DC power applied thereto. This will result in a start pulse being applied to input of monostable multivibrator 110 which is designed to act as a timing gate of electronic timer which starts the timing action upon the start pulse being applied to its input, to hole the timing gate open for a predetermined period of time. In this instance the nominal gate period is 10 seconds. Therefore, at output of multivibrator 110, a positive long pulse will appear, which pulse is used to overcome a negatively biased amplifier as at 131 or 131', which amplifiers use NPN junction transistors in their circuits. These amplifiers will thereby be caused to change from their cut-off states to their conductive states only during the period of the 10 second gate in view of the 10 second long positive going pulse output appearing at 112.

Monostable multivibrators of the type 110, 116 or 125 are known in the art and details thereof need not be discussed. An Ultra-Long Monostable Multivibrator is described at page 431 of the textbook entitled Sources of Electronic Circuits by Markus, copyright 1968, Mc Graw Hill Book Company, New York. This circuit is one discussed in greater detail by the authors, Schaeffert and Goldman in Electronic Equipment Engineering, Volume 12, Issue 12, December, 1964, pages 57-58, published by Mactier Publishing Corporation, New York City. This circuit shows the input to the multivibrator with a positive going trigger pulse applied, and an output of a long positive going pulse. The parameters $R_3$ and $C_1$ of the improved circuit therein determines the pulse period of the long output pulse. If $R_3$ were set to 500,000 ohms and $C_1$ to 20 microfarads, the required 10 second pulse width output is obtained. The unimproved circuit, also shown in this article, provides a separate output trigger pulse which may be used as an input to start multivibrator 116, and similarly trigger output of 116 may be used to start multivibrator 125, if such unimproved circuit is used instead of the improved circuit, which would avoid using microswitches 114-115 and 119-120. In such instance, two outputs would be shown as outputs from each of the multivibrators. For example, for multivibrator 110, the long 10 second positive going pulse would appear at line 112 and the short trigger pulse at the output would be present as a separate output. Hence in this case, wires 111 and 112 would be severed, and wire 111 would have a separate output trigger pulse to feed monopulse multivibrator 116 input directly or through gate 113 in conjunction with a pulse provided at 111'. In the instance of utilizing the output trigger pulse of about 5 millisecond width to trigger multivibrator 116, both contactor pair 114-115 and gate 113 can be eliminated. Similar modifications to the circuit can be made with respect multivibrator 125, gate 122 and contactors 119-120.

The other Long-Pulse Monostable circuit is shown at page 432 of the same textbook by Markus, here with an input trigger and a long pulse output without additional option of the trigger pulse output. This circuit needs some timing capacitor adjustment to decrease the time of the timing gate from 11 to 10 seconds, but otherwise its connection would be as shown in FIG. 6.

The momentarily closed contactor pair 108-109 will initiate the required start pulse for multivibrator 116 and thereby provide the long output positive going pulse at 111 and 112 for the first 10-second timing period.

Amplifier 131 input is connected to wire 112 so that during the 10 seconds when multivibrator 116 produces its positive going pulse output, amplifier 131 will be biased so that it passes intelligence applied to microphone 130 through capacitor 127 and into the input of amplifier 131.

The output of amplifier 131 is connected to stationary contactor 191 of record-reproduce switch 180. Contactor 192, during the record mode, in cooperation with contactor 191, will enable intelligence or sound imposed upon microphone 130 to be passed through capacitor 127, through amplifier 131 and into the intelligence coil of head 51.

During recording mode, oscillator 150 having a frequency of about 60 kilohertz will provide the requisite AC bias or recording carrier since such oscillator is connected to contactor 181, and during recording mode contactor 182 which is in cooperation with contactor 181 is also connected to the bias or carrier coils of each of heads 51, 52 and 53.

Microphone 130 is also connected through similar capacitors 128 and 129 to inputs of amplifiers 141 and 151 respectively.

When cam 44 rotates about 120 degrees, the high portion of cam 44 cooperates with the roller at tip of microswitch contactor 114 of contactor pair 114-115. Contactor 114 is at positive DC potantial, so that upon momentary cooperation of contactors 114 and 115, a pulse will be applied to contactor 115 providing a pulse input at 111' to AND gate 113. Pulses at 111 and 111' will provide a pulse at output of gate 113 and hence an input to multivibrator 116 to start this multivibrator in producing its 10-second positive going pulse timing gate output just when the prior multivibrator finished producing its timing gate.

In actuality, the AND gates 113 and 122 could be eliminated since microswitches 114-115 and 119-120 are used and can connect such microswitches directly to the multivibrator inputs to provide the start pulse inputs. But the use of AND gates which are pulse dependent assures that there will be no channel or amplifier operation overlap and that the various multivibrators will start at proper times in relation to completion of prior multivibrator action.

Hence monostable multivibrator 116 will have been triggered on at same time as multivibrator 110 ceases to produce its long pulse output, and consequently a 10-second positive pulse output is provided at 117 and 118. As heretofore described for amplifier 131, amplifier 141 will be conductive during the second 10-second period only, with amplifier 131 and amplifier 151 being cut off. The output of amplifier 141 being connected to contact 194 of switch 180, and contactor 195 being in cooperation with contact 194, signal path connecting the intelligence coil of head 52 will be provided. Recording will then be possible during the second 10-second period due to operation of multivibrator 116.

When cam 44 has moved the second 120° in rotation, the high portion of cam 44 will be in position to cooperate with the roller at the tip of contactor 120, so that contactor 120 cooperates with contactor 119 that has a DC positive potential thereat, thereby creating a pulse at line 118'. The pulses at 118 and 118' will provide the requisite AND logic of unity to AND gate 122 input so that the output of gate 122 will provide a pulse to start monostable multivibrator 125. Once started, as in the foregoing cases, multivibrator 125 will provide its output of a 10 second positive going pulse at 126 as an input to the base of the NPN transistor constituting the normally negatively biased cut off condition oof amplifier 151, and hence the positive pulse at 126 will overcome the negative bias and cause amplifier 151 to conduct, so that signals applied through microphone 130 and capacitor 129 will be amplified by amplifier 151. The amplified output of amplifier 151 is connected to contactor 197 of switch 180, and contactor 198 being in cooperation with contactor 197 during the record mode, will provide a connection to the intelligence coil of head 53.

At the end of the last 10-second period, the high portion of cam 44 will again be in cooperation with the roller of contactor 105 to open contactors 105-106 and shut off motor 30, cam 44 having completed its third 120° segment of rotation.

wires are utilized to connect the inputs of the recording amplifiers to the inputs of the reproducing amplifiers, so that the control circuit for each of the three 10second periods used for recording are also used for reproducing the recorded sound, using the same heads 51, 52 and 53.

Accordingly, in the reproduce mode, contactor 192 will cooperate with contactor 193, contactor 195 will cooperate with contactor 196, and contactor 198 will cooperate with contactor 199, to connect the intelligence coils of heads 51, 52 and 53 to inputs of amplifiers 131', 141' and 151' respectively. Contactors 181 and 182 will be open since the switch blades 182, 192, 195 and 198 will be in the reproduce position, therefore removing the AC bias or modulation signal from all the heads, not used for reproduction purposes.

In similar sequence of operation of multivibrators 110, 116 and 125 with ther corresponding reproduce amplifiers 131', 141' and 151', all the outputs thereof connected to loudspeaker 160, the sound tracks imposed upon the recording medium will be reproduced in the same manner due to programmed track switching as described in connection with the recording mode.

Though, three 10-second record or reproduce periods were shown utilizing three heads, it is obvious from the above that any number greater or less than three heads can be used when providing an equal number of switching channels, thereby enabling the use of non-translatable or non-scan type heads.

Referring to FIGS. 7 and 8, it should therefore be obvious from the partial electronic system schematic that FIG. 6 can be substantially simplified. Microswitch 114-115 can be eliminated by providing a delay trigger pulse circuit 135 where its input is connected to wire 111 and its output at 136 is connected as an input to multivibrator 116. Also microswitch 119-120 can be eliminated by connecting wire 118 to input of delay trigger pulse circuit 145 the output 146 of which can be connected directly to the input of multivibrator 125. In FIG. 7 the partial electronic circuit of the control system is shown as having its initial trigger pulse initiating the multivibrator at 110 being connected to contactor 109 of microswitch 108-109, the same as in FIG. 6. It should be understood that the components shown in FIG. 6 numbered 100, 44, 30 34, 180, 131', 141', 151', 160, 130, 127, 128, 129, 150, 51, 52, 53 and interconnecting wires between them which are not shown in FIGS. 7 and 8, are otherwise identical with FIG. 6 in these respects.

With particular reference to FIG. 8, NPN transistor with common emitter is used for the delay trigger pulse circuits 135 or 145. When input to base 111 or 118 representing the long 10 second pulse thereat is applied, the normally negatively biased base potential is raised to a positive potential by virtue of the positive going 10 second pulse to cause base current to flow and hence for the transistor to conduct. Current will therefore flow during the 10 second period through the resistor in series with the emitter and apply a positive voltage across R-C combination. The values of R and C are selected so that between the junction of R and C and ground capacitor C will have a positive going short pulse, in the order of 5 to 10 milliseconds wide at output terminal 136 or 146 to act as a trigger for the multivibrator being started. The short pulse width is obtained at 136 or 146 by virtue of the integration circuit comprising R and C. The voltage level of that pulse is of such magnitude sufficient to trigger the multivibrator in question.

A similar circuit to that shown in FIG. 8, except with R-C network eliminated, and its output being between the emitter and ground, is used for amplifiers 131, 131', 141, 141', 151 and 151'.

Referring to FIG. 9, an electromechanical version of the electronic control system may also be used for multiple sound track production with stationary heads.

In this control system the heads at 51, 52 and 53 are connected to switch 180 in identical manner as in the electronic system. The record amplifiers 131, 141 and 151 are connected to switch 180 as in the electronic system. Microphone 130 may be connected directly to amplifiers 131, 141 and 151 if the bias voltage at the base of the NPN transistor comprising the amplifier is low, otherwise to avoid damaging the microphone, capacitors may be connected in series with each amplifier input as in the electronic system. The oscillator 150 is the same and is similarly connected through switch 180 to bias the heads during record mode. In the reproduce mode the reproduce amplifiers 131', 141' and 151' are connected to switch 180 as in the electronic system and all outputs from these amplifiers are connected to loudspeaker 160. The jumper wires connecting inputs of amplifiers 131 and 131', 141 and 141' and 151 and 151' are not required here since intelligence coil of each head is separately connected through a microswitch which is in the closed contact position only during its duty cycle, either when recording or reproducing sound.

Consequently, the intelligence coil of head 51 connected to contactor 201 of microswitch 201-202, and contactor 202 is connected to movable contactor 192 of switch 180. The intelligence coil of head 52 is connected to contactor 212 of microswitch 212-213 and contactor 213 is connected to movable contactor 195 of switch 180. The intelligence coil off head 53 is connected to contactor 223 of microswitch 223-224 and contactor 224 is connected to movable contactor 198 of switch 180. In this way the heads may all be switched by manual operation of switch 180 from the record to the reproduce mode or vice-versa.

Push button 100, microswitch 105-106, motor 30, wheel 34 and cam 44 are identically structured and connected as in the electronic control system. Here however additional three cams 210, 216 and 225 with raised portions extending about 120° each at cam peripheries are needed; such cams being mounted on the same shaft as cam 44. These additional cams will in conjunction with microswitches 201-202, 212-213 and 223-224 respectively substitute in the mechanical sense for the structure utilized in the electronic system to provide similar functions.

Hence, the cams and the associated microswitches are spaced 120° in angular rotation from each other, so that the when motor 30 is energized as in the electronic system and cam 44 begins to be rotated, cam 210 will close microswitch contactors 201-202 for the first 10 seconds, the roller of contactor 202 riding on the high portion of cam 210 for 10 seconds will cooperate during such period with the high portion of cam 210. This will permitt recording by head 51, or reproducing sound when in the reproduce mode by such head. At the end of the first 10 seconds, contacts 201-202 will open and cam 216 will be in position so its high portion is in cooperation with contactor 213 of microswitch 212-213 for the next 10-second period. At the end of such middle 10-second period, cam 225 will be in position to have its high portion cooperate with contactor 224 of microswitch 223-224 for the final 10 second period of operation, at the end of which time the cams will be back in their start position, including cam 44 which will shut off motor 30 automatically as in the case of the electronic system.

I claim:

1. Means for providing stationary images and sound related to said images, comprising the combination:
    a plurality of non-translatable magnetic transducer heads;
    an endless magnetic medium in cooperation with said heads;
    control means connected to said heads for providing a plurality of sound tracks for each of the images, one said head per sound track, said control means including
    means for disconnecting a first of said heads at end of its corresponding sound track and connecting a second of said heads at the beginning of its corresponding sound track, substantially only one of said heads being activated during any one transducing time period;
    means for transducing an analog intelligence message between said heads and sound tracks, said means for disconnecting and connecting enabling the message to be continued from one of said sound tracks to another; and
    means, coupled to the control means, for initiating translation of the magnetic medium and for translating said magnetic medium a whole number of complete revolutions, one said transducer head activated for each of said revolutions, and for terminating translation of said magnetic medium at the end of a last of said complete revolutions.

2. The invention as stated in claim 1, wherein said control means is electronic.

3. The invention as stated in claim 2, wherein said electronic control means comprises:
    a motor having a timing cam integral therewith; and
    digital circuitry initiated by action of said cam.

4. The invention as stated in claim 3, including a plurality of switches coupled to the cam.

5. The invention as stated in claim 3, wherein the digital circuitry comprises a plurality of electronically interconnected monostable multivibrators.

6. The invention as stated in claim 5, including a time delay trigger circuit connecting the output of one of said multivibrators with the input of another one of said multivibrators 7. The invention as stated in claim 1, wherein said control means is electromechanical.

8. The invention as stated in claim 7, wherein said electromechanical control means comprises:
    a motor having a timing cam;
    a plurality of cams driven by said motor during operative mode of said control means; and
    a plurality of switches in cooperation with the plurality of cams, one of said switches for each one of said plurality of cams.

9. The invention as stated in claim 8, wherein said heads are connected to said plurality of switches, one said head per switch.

10. The invention as stated in claim 1, wherein said means comprises a slide frame portion, said endless magnetic medium being a translatable record medium portion integral with the slide frame portion.

11. The invention as stated in claim 10, wherein said translatable record medium comprises a plurality of magnetic belts adapted for translation within the confines of the slide frame portion.

12. The invention as stated in claim 10, wherein said translatable record medium portion comprises a disk having a central opening.

13. The invention as stated in claim 10, wherein said record medium portion includes rollers and a magnetic belt adapted to the rollers for translation thereby.

14. The invention as stated in claim 13, where said heads are so oriented so as to provide pressure orthogonal to the recording surface of the belt.

15. The invention as stated in claim 13, including:
    at least one impeller wheel in cooperation with said rollers; and
    a motor coupled to said at least one impeller wheel.

16. The invention as stated in claim 15, including a timing cam driven by said motor during operative mode of said control means.

* * * * *